US 6,682,124 B1

(12) United States Patent
Böhnke

(10) Patent No.: US 6,682,124 B1
(45) Date of Patent: Jan. 27, 2004

(54) CONVERTIBLE VEHICLE WITH THROUGH-OPENINGS FOR LINKAGE ELEMENTS

(75) Inventor: Achim Böhnke, Tecklenburg (DE)

(73) Assignee: Wilhelm Karmann GmbH, Osnabrück (DE)

(*) Notice: Subject to any disclaimer, the term of this patent is extended or adjusted under 35 U.S.C. 154(b) by 0 days.

(21) Appl. No.: 10/302,730

(22) Filed: Nov. 22, 2002

(30) Foreign Application Priority Data

Nov. 27, 2001 (DE) .......................... 101 58 058

(51) Int. Cl.[7] .................................................. B60J 7/20
(52) U.S. Cl. .............................. 296/107.08; 296/136.06
(58) Field of Search ....................... 296/107.01, 107.08, 296/107.09, 136, 116, 136.01, 136.04, 136.05, 136.06

(56) References Cited

U.S. PATENT DOCUMENTS

| 2,747,928 A | * | 5/1956 | Olivier et al. | ......... 296/107.08 |
|---|---|---|---|---|
| 2,992,042 A | * | 7/1961 | Gilson et al. | ................ 296/136 |
| 3,170,726 A | * | 2/1965 | Lystad | ......................... 296/136 |
| 4,799,729 A | * | 1/1989 | Muscat | ......................... 296/136 |
| 5,921,608 A | * | 7/1999 | Schmitt et al. | ........ 296/107.08 |
| 5,967,593 A | * | 10/1999 | Schuler et al. | ............... 296/136 |
| 6,257,650 B1 | * | 7/2001 | Lee et al. | .............. 296/107.16 |
| 6,318,792 B1 | * | 11/2001 | Neubrand et al. | ..... 296/107.08 |
| 6,454,343 B1 | * | 9/2002 | Wagner et al. | ......... 296/107.08 |
| 6,508,504 B1 | * | 1/2003 | Conradt et al. | ............. 296/136 |

* cited by examiner

Primary Examiner—Dennis H. Pedder
Assistant Examiner—Patricia L. Engle
(74) Attorney, Agent, or Firm—Friedrich Kueffner

(57) ABSTRACT

A convertible vehicle with a roof, which can be stowed in the rear area of the vehicle, and which is connected to supports underneath a windowsill line by linkage elements, which are provided at least on the sides. When the roof is closed, the linkage elements extend-through through-openings in a plane of the windowsill line, wherein the through-openings for the linkage elements can be covered at least to a certain extent by panel parts. The convertible vehicle is constructed in such a way that at least one panel part is supported on a bracket acting from underneath and can be lowered as it is being opened.

12 Claims, 17 Drawing Sheets

CONVERTIBLE VEHICLE WITH THROUGH-OPENINGS FOR LINKAGE ELEMENTS

BACKGROUND OF THE INVENTION

1. Field of the Invention

The present invention relates to a convertible vehicle with a roof which can be stowed in the rear part of the vehicle and which is connected to supports located underneath the windowsill line by linkage elements. The linkage elements are provided at least on the sides and, when the roof is closed, extend through openings and through the plane of the windowsill line, wherein the through openings for the linkage elements can be covered to at least some extent by panel parts.

2. Description of the Related Art

In convertible vehicles of this type it is desirable for the through-openings for the linkage parts on the sides to be completely covered after the roof has been opened and stowed in order to avoid unattractive shaft openings, which are accessible from above. This covering of the openings is not only for the sake of appearance but also for the sake of preventing anything from intruding into the openings and into the roof mechanism behind them. In the closed state of the roof, at least some of the opening must be free to allow the linkage elements to pass through. These areas of the openings should be kept as small as possible in order to have as little negative effect on the interior space as possible. It is known for this purpose that each of the through-openings can be provided with several panel parts, all of which are in the closed position when the roof is open, but only some of which are closed when the roof is closed, while others remain open. It is also known that at least one panel part can be mounted with the freedom to slide, where, for this purpose, guide links are provided in the frame parts surrounding the through-openings. These types of guide links, however, constrict the through-opening and are also usually unattractive, because they consist of hard plastic, for example, nor are they covered by a fabric panel, which could be matched to the interior space of the vehicle.

SUMMARY OF THE INVENTION

The invention is based on the problem of providing the largest possible opening after the panel parts have been opened and of providing panel parts which are as visually attractive as possible.

In accordance with the present invention, at least one panel part is supported by a bracket acting from underneath, wherein the panel part can be lowered as it is being opened.

With the configuration according to the invention, the panel part which is supported from underneath can be held without additional support from the frame such as lateral links or the like. The through-opening, which is created when the panel part is opened, is thus quite large. When the panel part is in its closed position, it can be pressed from underneath against adjacent edge parts of the through-opening. As a result, visually unattractive connecting links in the edge area of the through-opening can be avoided. The boundary around the through-opening can be painted, for example, or covered with fabric. The mechanical requirements on the edge surrounding the through-opening are reduced, because this edge does not have to provide any retaining or guide functions for the panel part, which is supported as specified according to the invention. It is therefore not necessary for the frame part of the through-opening to be designed as a sturdy component of hard plastic, for example, which means that it becomes possible to meet optical and tactile standards of higher quality.

If the panel is designed so that it can be moved vertically downward and then shifted in the longitudinal direction after it has been lowered, it can be guided completely out of the area in which the linkage elements must move. In the longitudinally displaced position, the panel part can be held invisibly underneath, for example, the outer parts of the auto body.

A common intermediate tractive force element such as a pull rod is especially advantageous here, both for the downward movement and also for the subsequent longitudinal movement, these two movements proceeding one after the other under the positive guidance provided by links inside the bracket, which remains covered at all times. Thus there is no need for any additional means of controlling the process, which simplifies the overall design.

Another simplification can be obtained by providing springs to return the cited panel part against the force of the intermediate tractive force element. This eliminates the need for an additional drive element.

It is especially favorable for the combination of several panel parts to be mounted on a common carrier, which can be supplied in modular form to the assembly process. The assembly work is thus simplified. The finished, prefabricated carrier is simply mounted in the body of the vehicle.

The various features of novelty which characterize the invention are pointed out with particularity in the claims annexed to and forming a part of the disclosure. For a better understanding of the invention, its operating advantages, specific objects attained by its use, reference should be had to the descriptive matter in which there are described preferred embodiments of the invention.

DESCRIPTION OF THE PREFERRED EMBODIMENTS

Figure 1:
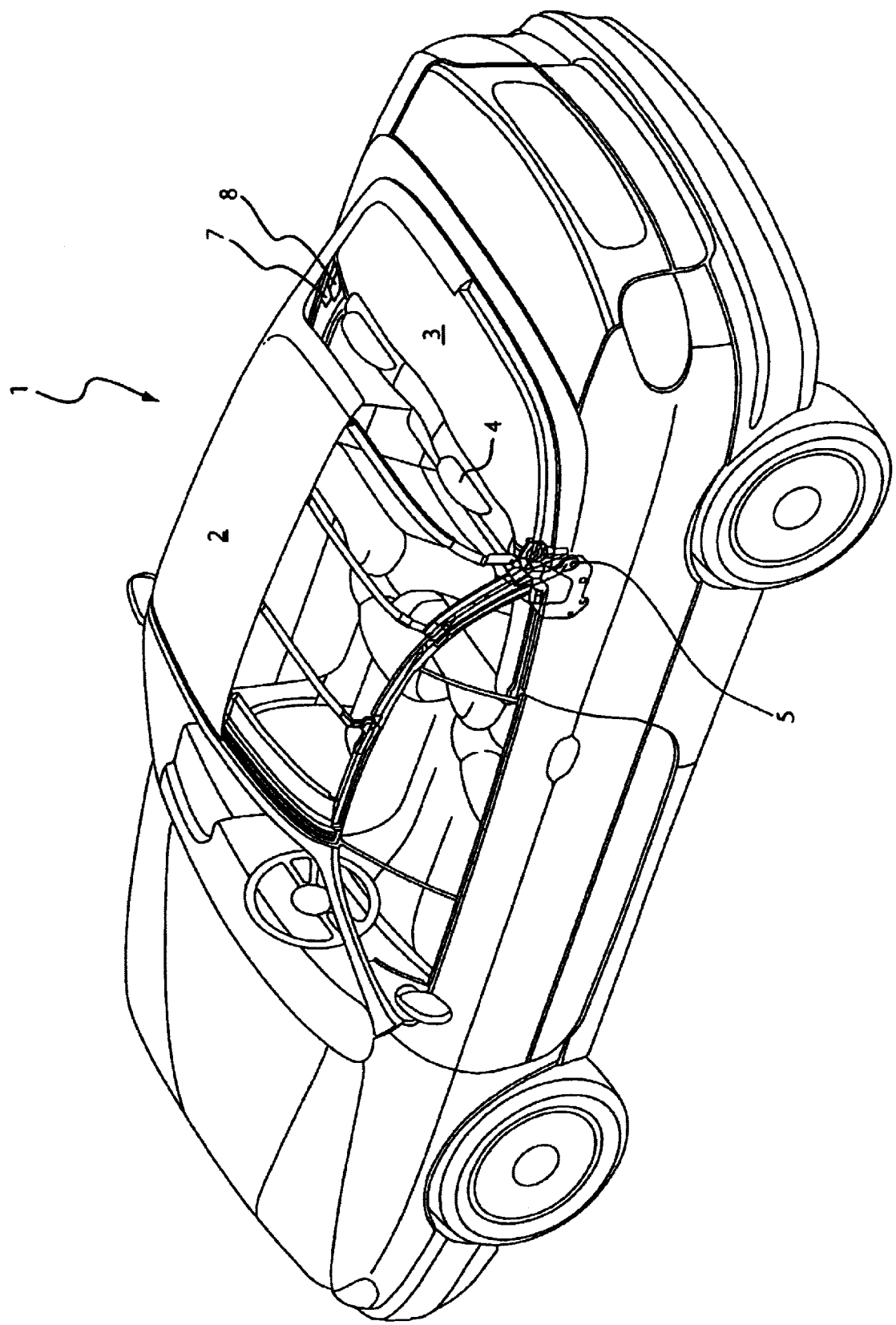
FIG. 1 is a perspective view of a convertible vehicle according to the invention.

The convertible vehicle 1 shown in FIG. 1 has a flexible, fabric-covered roof 2, which can be stowed in a rear area 3 of the vehicle, behind the passenger compartment, of which here the rear headrests 4 are shown. A cover for the stowed roof, such as a pivoting lid or a tarp, is possible but not mandatory. A roof with at least some rigid parts is also conceivable. In the closed state of the roof (FIG. 1), lateral linkage elements 5 pass through approximately the plane E of the windowsill line in the area of the side through-openings 6. The openings 6 can be covered by panel parts 9, each of which is divided into subpanels 7, 8 on each side of the vehicle. Each of these subpanels can be actuated individually, and, depending on whether the roof 2 is open or closed, they cover or expose different areas of the openings 6.

In the exemplary embodiment, the panel parts 9 are divided into the two subpanels 7 and 8. A subdivision into more than two subpanels 7, 8 or the use of only a single, one-piece panel is also conceivable.

The panel parts 9 are each assigned to an external, lateral edge area of the vehicle body. They are symmetrical to a vertical, longitudinal plane of the vehicle.

Figure 4:
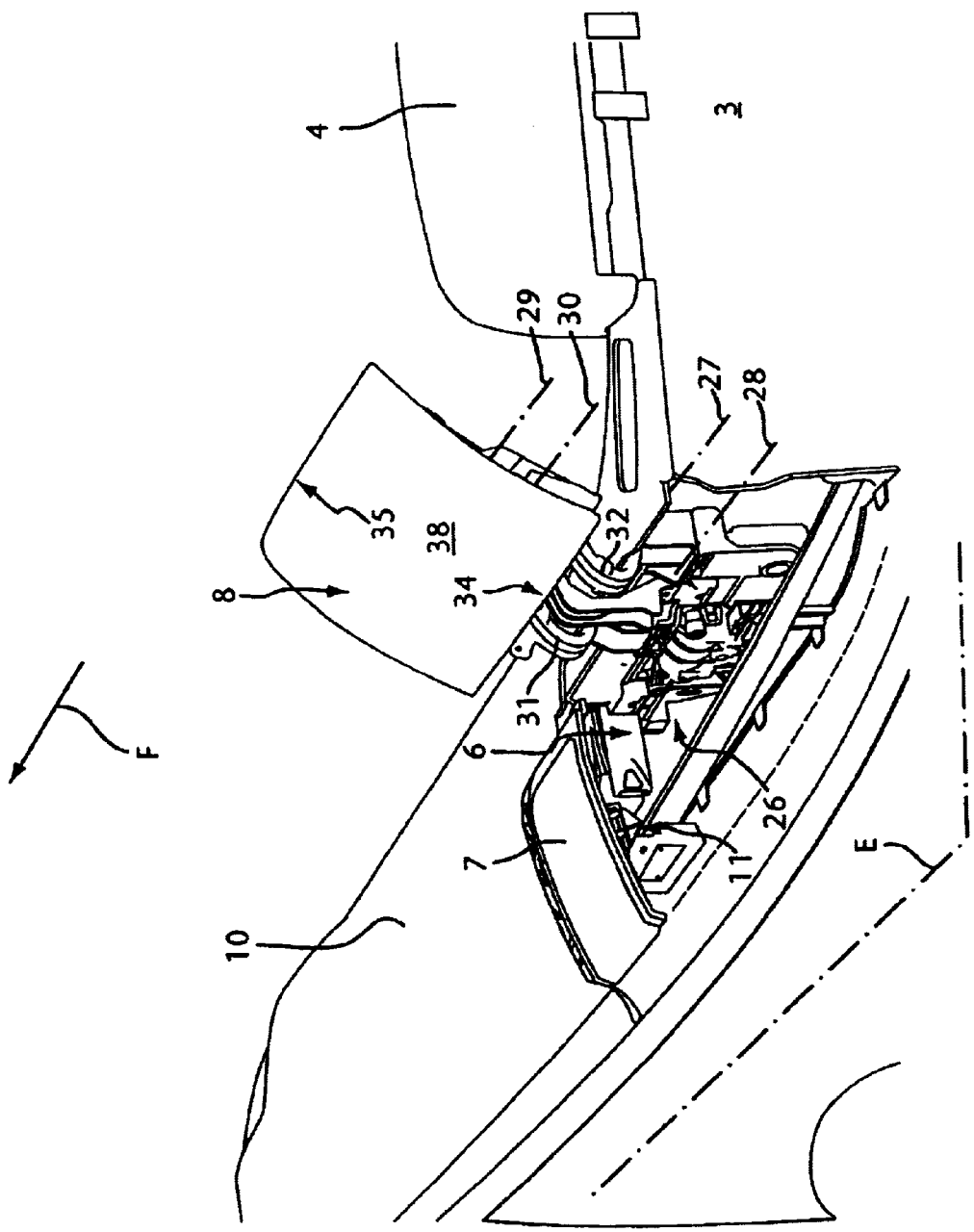
FIG. 4 is a view similar to that of FIG. 3 after the forward panel part has been lowered vertically.

In the closed position (FIG. 2), the two panel parts are essentially flush with the upper surface of an interior panel 10, which is even with the windowsill. The panel part 7, which is in front with respect to the travel direction F, is supported by a bracket 11, which is located underneath it and which is completely covered by it; the panel part 7 can be lowered with respect to this bracket. This effect of this lowering process is shown in FIG. 4 and comprises an essentially vertical stroke, by which the panel part 7 can be lowered below the plane of the panel 10.

Figure 16:
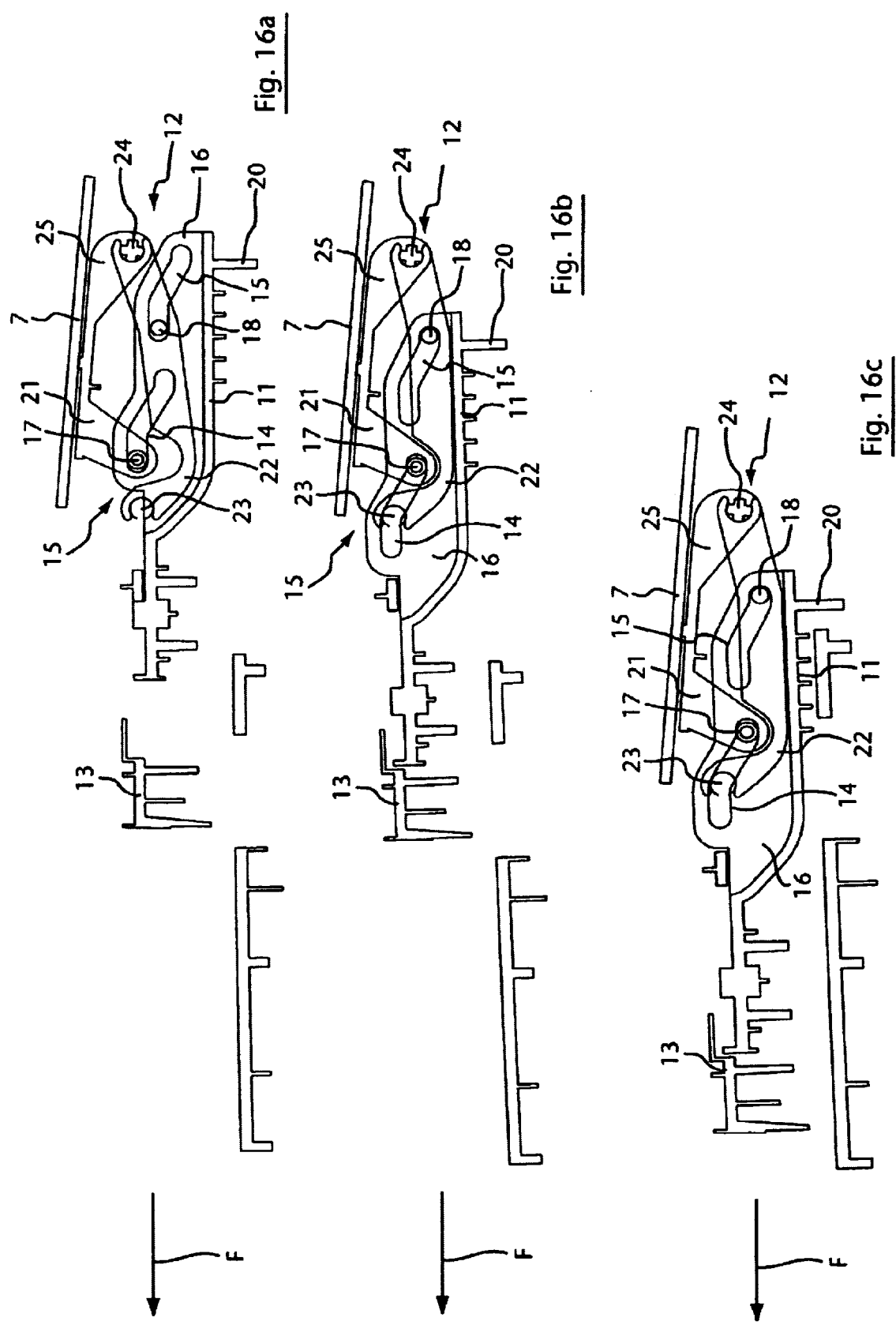
FIGS. 16a, 16b and 16c are schematic, longitudinal cross sections through the lowerable plate part in the closed state, in the lowered state, and in the lowered and longitudinally retracted state.

The details of the various phases of the movement of the panel part 7 can be seen in FIGS. 16a, 16b and 16c: The bracket 11 for the panel part 7 is a component of a slide 13, which is able to move as a whole longitudinally and parallel or nearly parallel to the direction of travel F, which slide is provided with a raising/lowering device 12 for the panel part 7. The slide 13 is produced, for example, out of a thermoplastic material by the injection-molding process, for example. It comprises a vertically upward-projecting part 16, in which two guide links 14, 15 have been cut out, each of which has an S-shaped form, slanting upward at an angle. Guided in the links 14, 15 are two essentially horizontal axle bodies 17, 18, assigned to the panel part 7. The axle 17 is mounted directly on an extension 21 of the panel part 7; the axle 18 is held by way of a pivoting extension 22, one end of which is connected to a pivot axle 23 of the slide 13, the other end to a pivot axle 24, which is mounted on an extension 25 of the panel part 7.

The slide 13 also has a contact point 20 for an intermediate tractive force element such as a pull rod, which is connected to a drive element (not shown).

In addition, two springs (not shown) with different spring constants are provided. A first spring with a smaller spring constant opposes the thrust of the axles 17, 18 in the links 14, 15 and thus the downward movement of the panel part 7. A second spring with a larger spring constant opposes the longitudinal displacement of the slide 13 after the panel part 7 has been lowered.

To open the panel part 7, a tensile force is exerted in the travel direction F on the extension 20, as a result of which, first, the bracket 11 supporting the panel part 7 is shifted forward in the travel direction F against the force of the weaker spring, so that the axles 17, 18 slide downward in the links 14, 15. The pivoting extension 22, which is held on the axle 23, which is stationary with respect to the slide 13, ensures that the panel part 7 does not move longitudinally with respect to the slide 13. Thus, in this first phase of the movement resulting from the exertion of tensile force, the panel part 7 is lowered almost vertically. Although the bracket 12 is shifted forward versus the slide 13 in the travel direction F, the displacement of the axles 17, 18 in the links 14, 15 relative to the bracket 11 have the effect of maintaining the longitudinal position of the panel part relative to the vehicle body overall.

As a result of the continued application of tensile force on the extension 20, work is now performed in opposition to the second spring, so that the entire slide 13 is pulled forward along with the bracket 11 in the travel direction F, as a result of which the panel part 7, now in the lowered state, is drawn forward and shifted underneath the panel 10.

The forward panel part 7 is relatively small in comparison to the rear panel part 8, so that, after the forward panel part 7 has been opened, there is only a small through-opening available for the linkage elements of the roof, for example. When the roof is closed, therefore, the forward panel part 7 can be open, whereas the rear panel part 8 is closed. The rear panel is opened only to allow the roof to pass through when the roof is being opened or closed.

The panel part 7 remains open as long as tensile force is being exerted. If there is an interruption in the application of the tensile force, the second, stronger spring relaxes first, as a result of which the slide 13 shifts in the reverse direction while the panel part 7 is still in the lowered position. Only then does the first, weaker spring relax, as a result of which the panel part 7 is shifted upward to fit flush with the surrounding panel 10.

In the exemplary embodiment, another, rear panel part 8 is provided, which is opened to allow the opening and closing of the roof and which can be brought into an essentially horizontal position flush with the surface of the panel 10 after the roof has been closed and also after it has been completely opened.

This rear panel part 8 is held on a pivoting parallelogram 26; this parallelogram comprises several pivot axles 27, 28, 29, 30, extending essentially in the longitudinal direction of the vehicle. The pivot axles 27 and 29 are connected by one or more pivoting levers 31, 32, and the pivot axles 28 and 30 are connected by one or more pivoting levers 33.

As the rear panel part 8 pivots upward, the edge 34 which is on the outside in the transverse direction of the vehicle pivots upward only slightly in comparison to the degree to which the edge 35 pointing inward toward the interior of the vehicle pivots. As a result, the panel part 8 assumes nearly a vertical position when fully open, as can be seen approximately in FIGS. 4, 5, 9, and 10.

Figure 17:
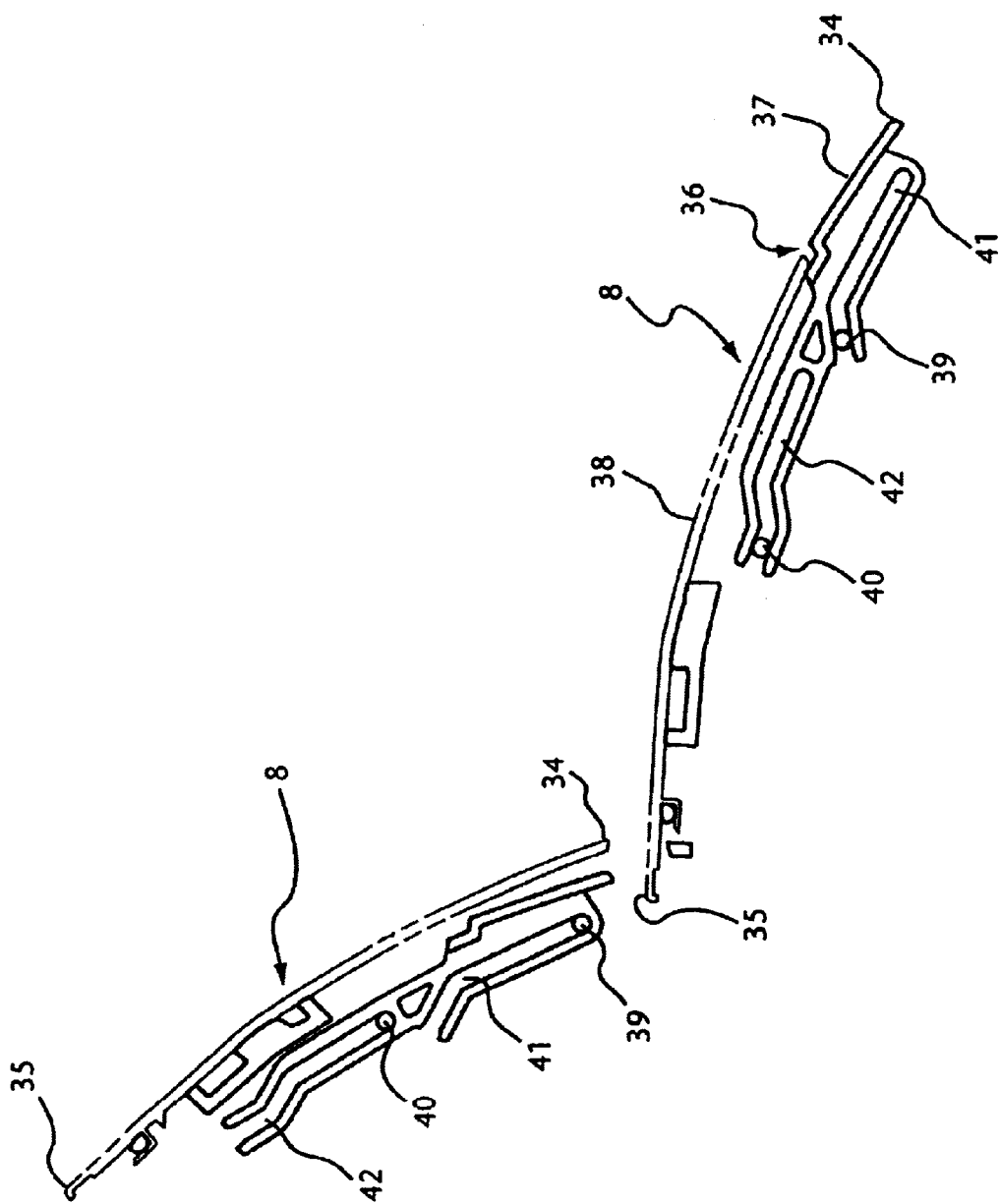
FIG. 17 shows transverse, cross-sectional views of the rear panel part in the opened and closed positions.

The panel part 8 in the present exemplary embodiment is made up of two parts, including a seam 36, extending in the longitudinal direction of the vehicle, parallel to the pivot axles 27, 28, 29, 30, this seam being located between a narrow exterior part 37 and a much wider interior part 38. The exterior part 37 can be retracted with respect to the interior part 38 when the panel part 8 is opened. FIG. 17 shows the panel part 8 in the closed and in the opened state. Axle stubs 39, 40 are formed on the inner, wider part 38; these stubs are able to slide in guide links 41, 42, which are essentially transverse to the vehicle and which are either connected to the exterior part 38 or are made as an integral part of it. The interior part 38 can also be made as a single unit with the axle stubs 39, 40 in the form of an injection-molded part.

The exterior part 37 rests snugly against the canopy top, such as a fabric canopy top, when the panel part 8 is closed, which minimizes the edge gap between the panel part 8 and the canopy top. The exterior part 37 is spring-loaded with respect to the interior part, as a result of which an outward-directed force is exerted, which causes the parts 37 and 38 to assume a position in which they are flush with respect to each other. As a result, the outward-facing edge 34 of the exterior part 37 can even cause a slight deformation of the inside lining of a fabric roof covering, as a result of which an especially exact connection is established between the roof and the panel part 8 when the roof is closed.

When the panel part 8 is opened, the opening of the pivoting parallelogram 26 exerts a pull by way of Bowden cables or other intermediate tractive force elements on drivers, which are connected to the exterior part 37, these drivers thus being drawn inward with respect to the interior part 38 toward the vertical longitudinal center plane of the motor vehicle 1. As a result, the exterior part is retracted underneath the interior part, and, as the panel pivots upward, the exterior part is prevented from interfering with the roof 2 as it passes through. The exterior part 37 is pulled underneath and parallel to the interior part, for which purpose links 40, 41 are preferably provided at the front and at the back of the exterior part 37. In the retracted state, the outside edge 34 is then formed by the interior part 38, whereas, in the extended state of the exterior part 37, the exterior part itself forms this exterior edge 34 (see FIG. 17).

Figure 2:
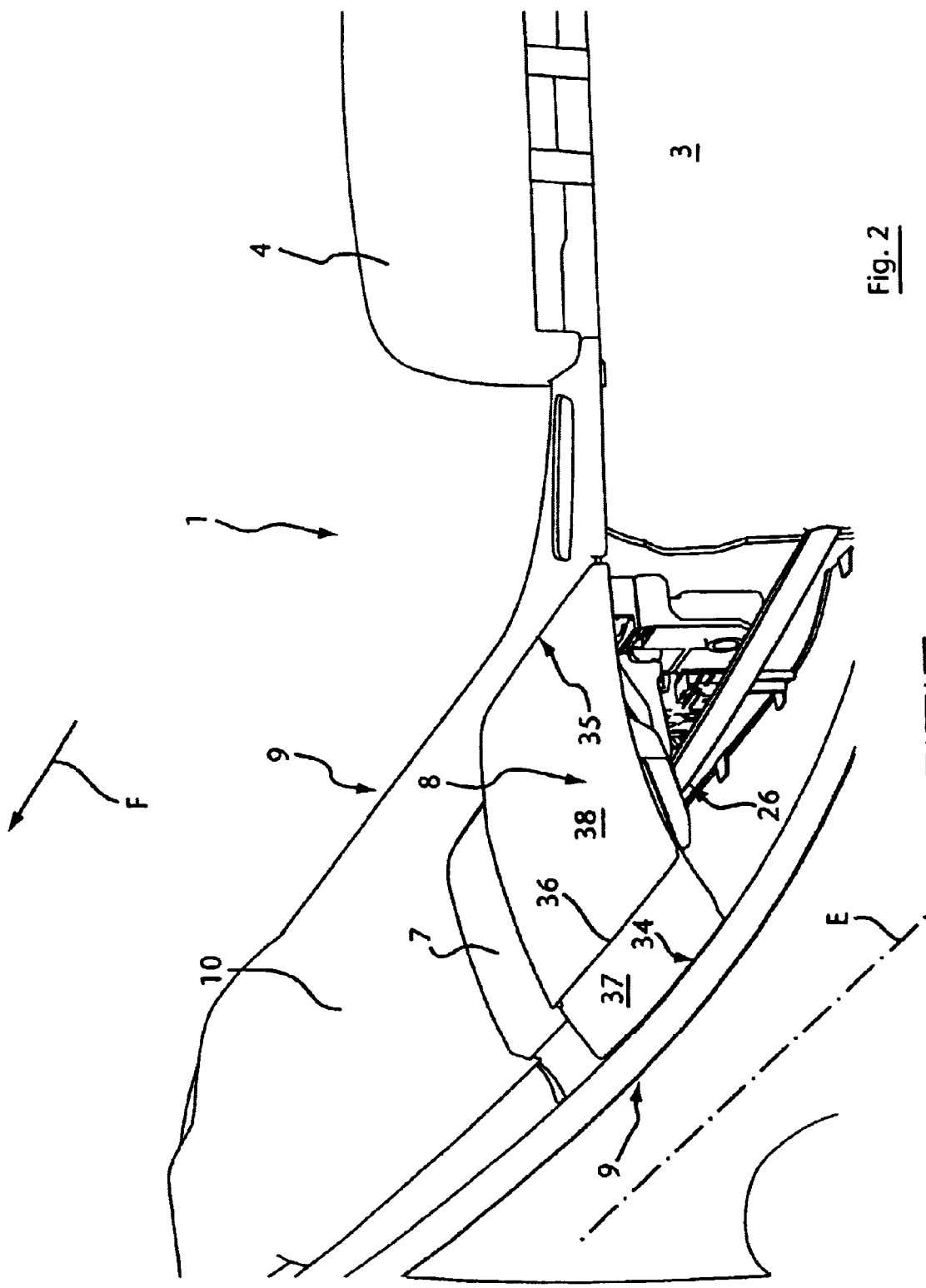
FIG. 2 is a detailed view of the through-opening for the linkage elements on the left side of the vehicle with respect to the direction of travel, where the opening is covered by the panel parts.
Figure 7:
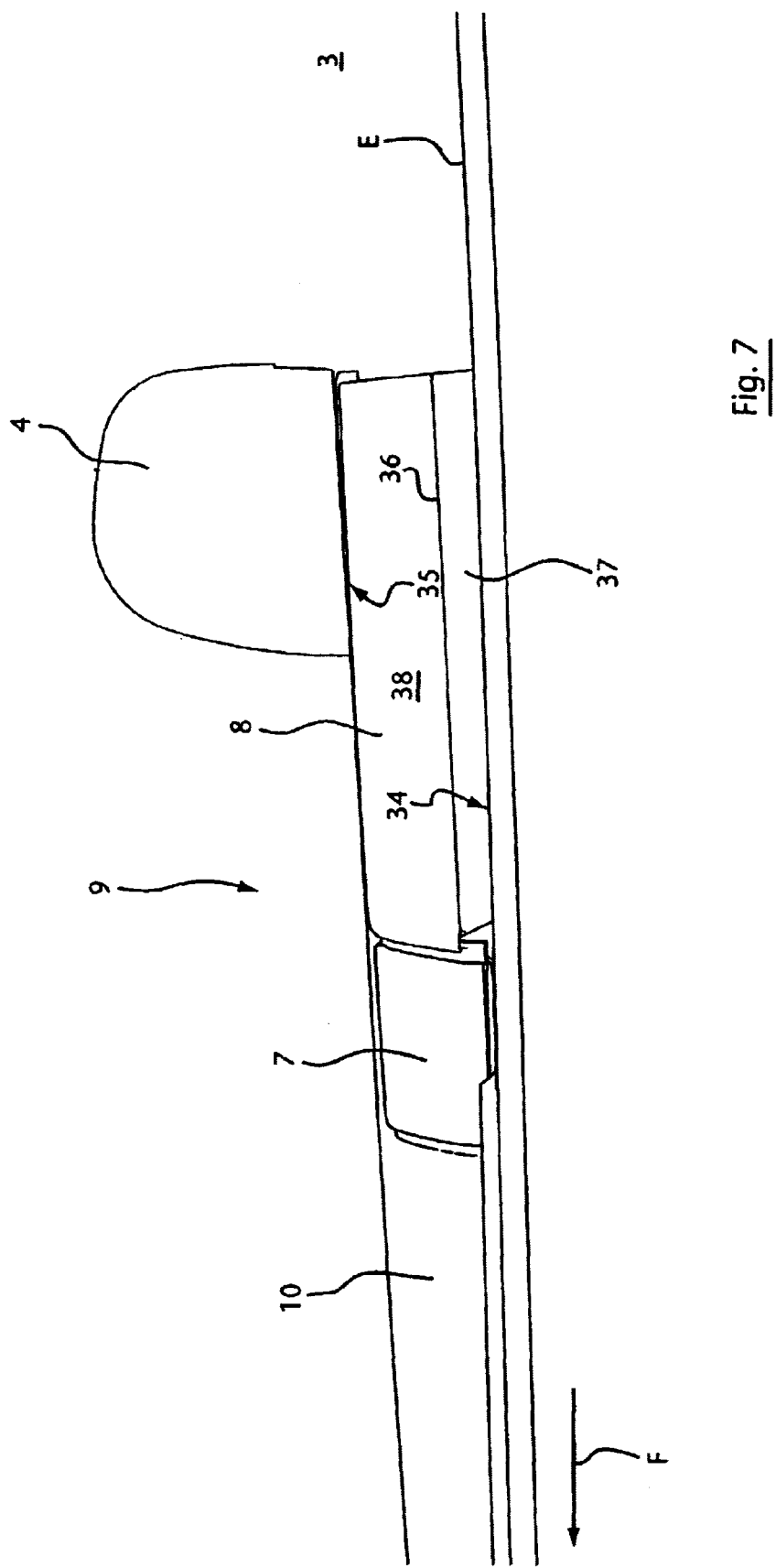
FIG. 7 is a schematic side view of the state according to FIG. 2.
Figure 12:
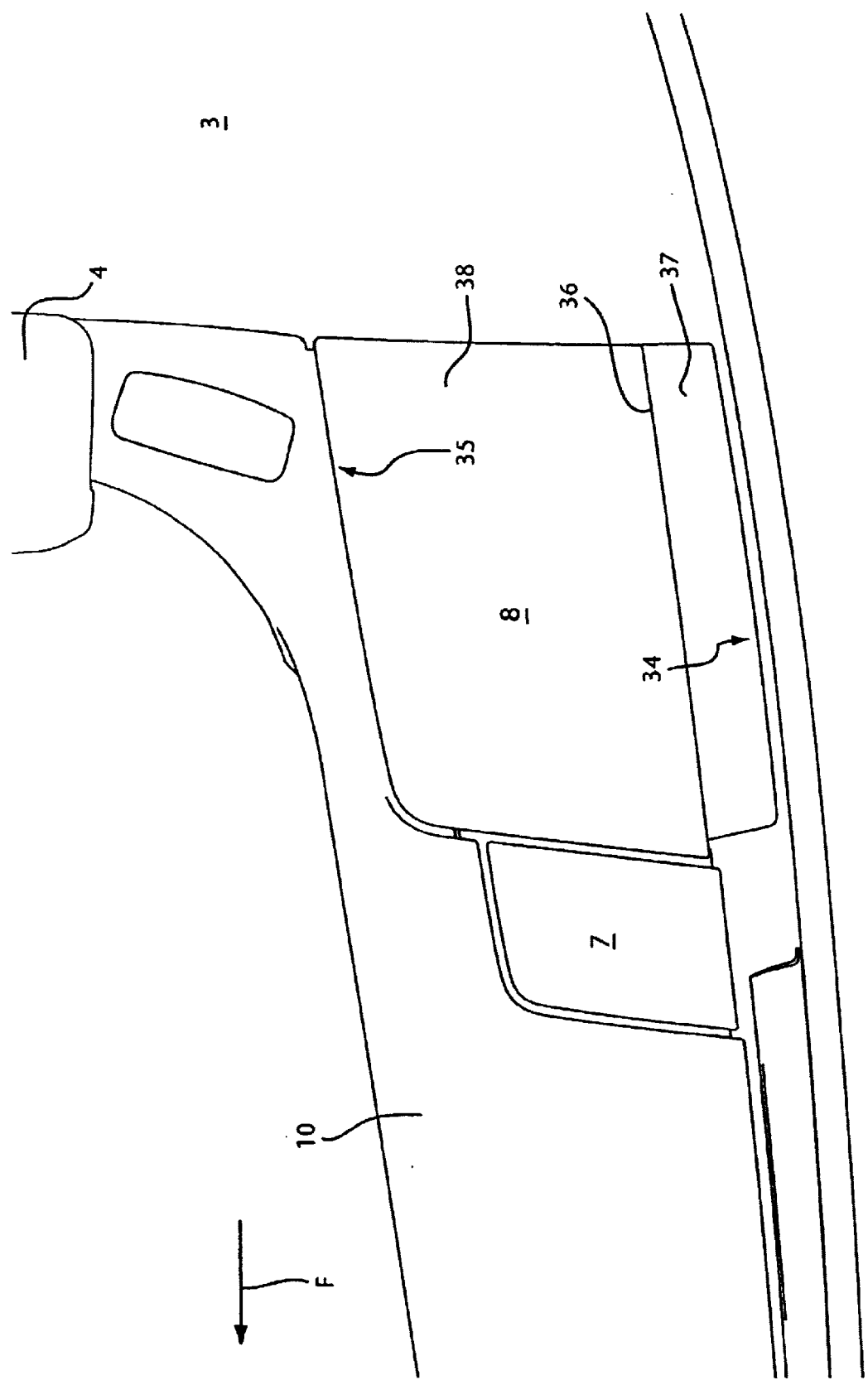
FIG. 12 is a top view of the state according to FIG. 2.

FIGS. 2, 7, and 12 show, each from a different angle, the state of the panel parts 7 and 8 after the roof 2 has been completely opened and stowed underneath the plane E: The panel parts 7, 8 are essentially horizontal and flush with the surface of the body-side panel part 10. The two panel parts 7, 8 are closed, so that, overall, a visually continuous surface is obtained.

Figure 3:
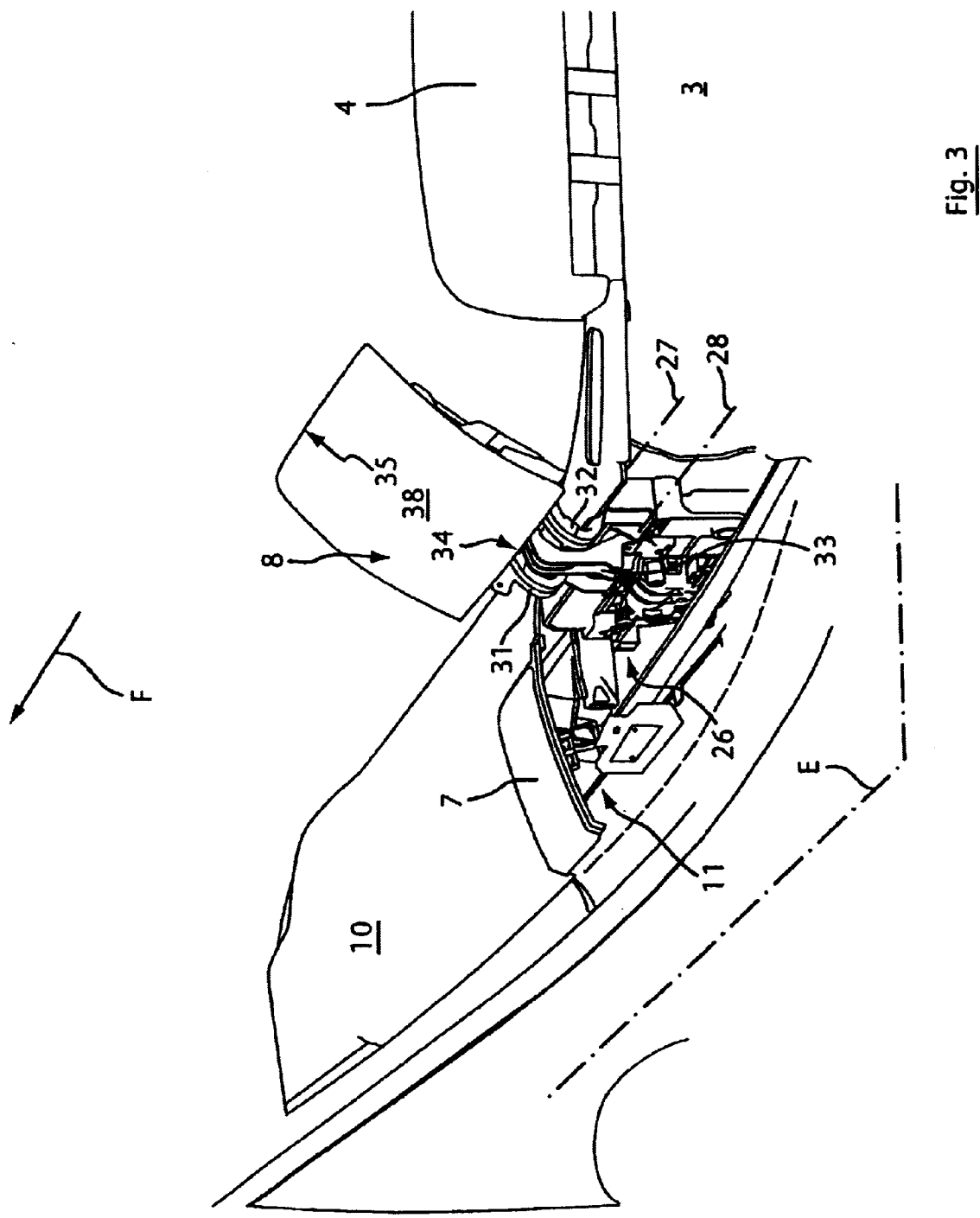
FIG. 3 is a view similar to that of FIG. 2 after the rear panel part has been swung upward, while the forward panel part remains closed.
Figure 8:
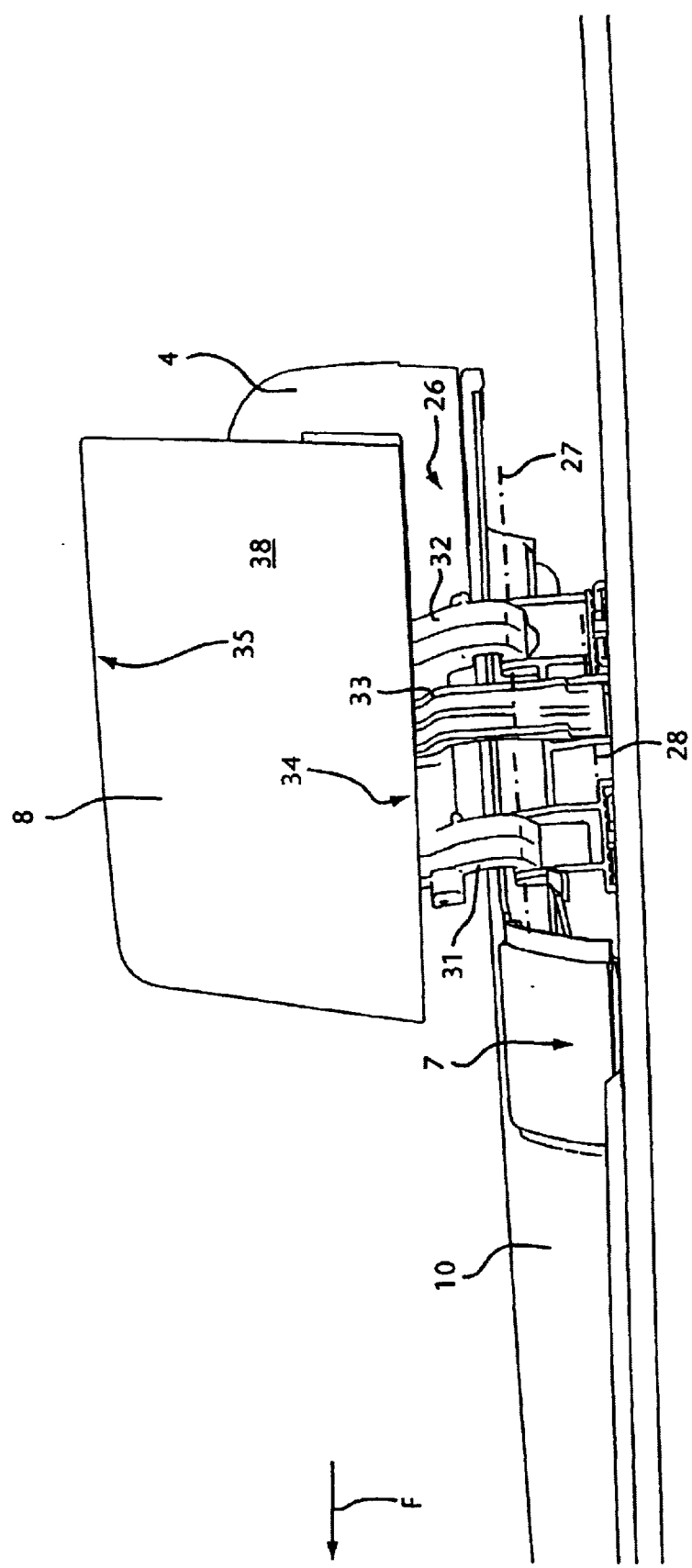
FIG. 8 is a schematic side view of the state according to FIG. 3.
Figure 13:
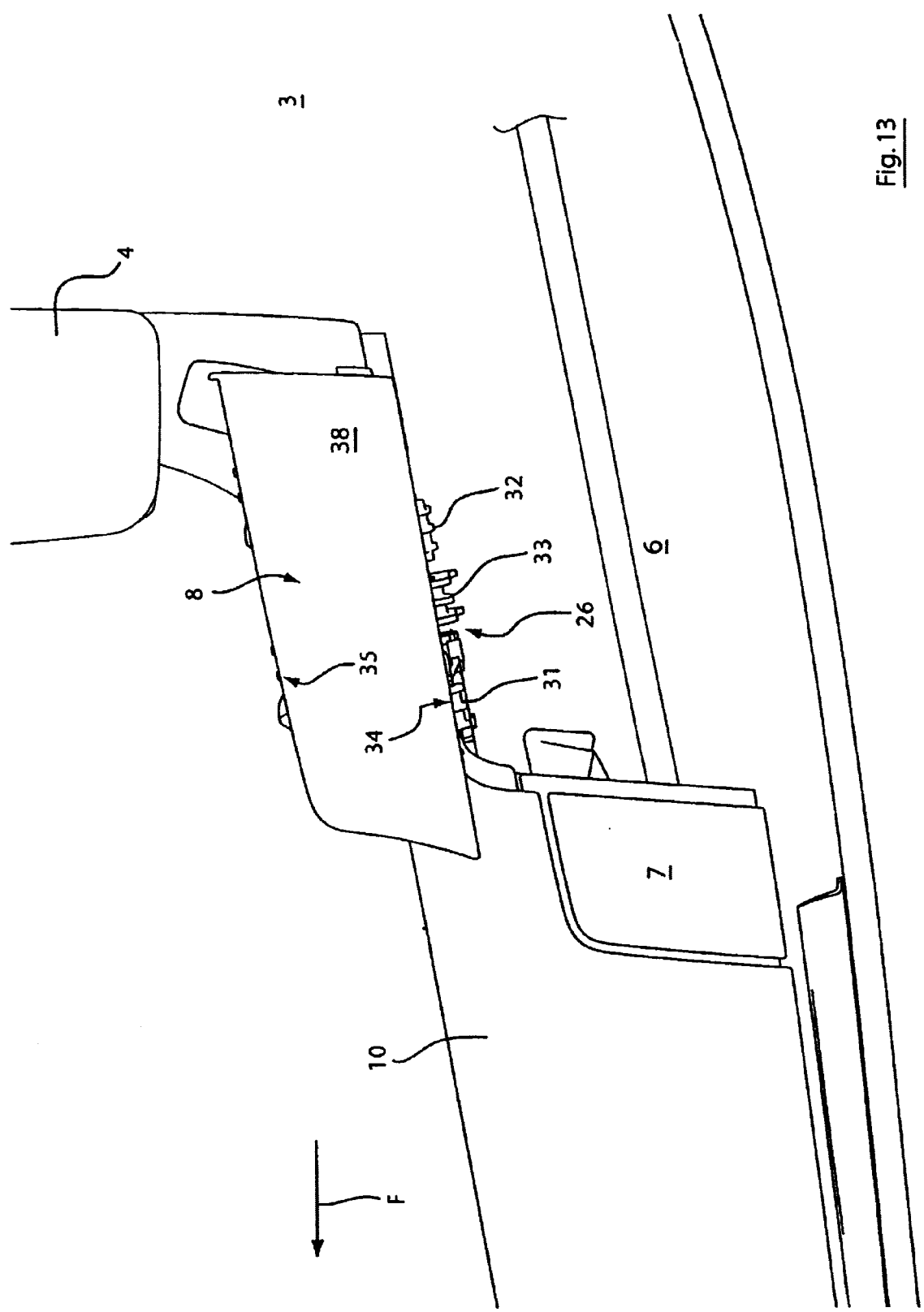
FIG. 13 is a top view of the state according to FIG. 3.

FIGS. 3, 8, and 13, each from a different angle, show the positions of the panel parts during the first phase of the roof opening procedure. The panel part 8 has been opened and has uncovered the through-opening 6, as a result of which the roof, pivoting up from the rear, can pass through the plane E.

Figure 5:
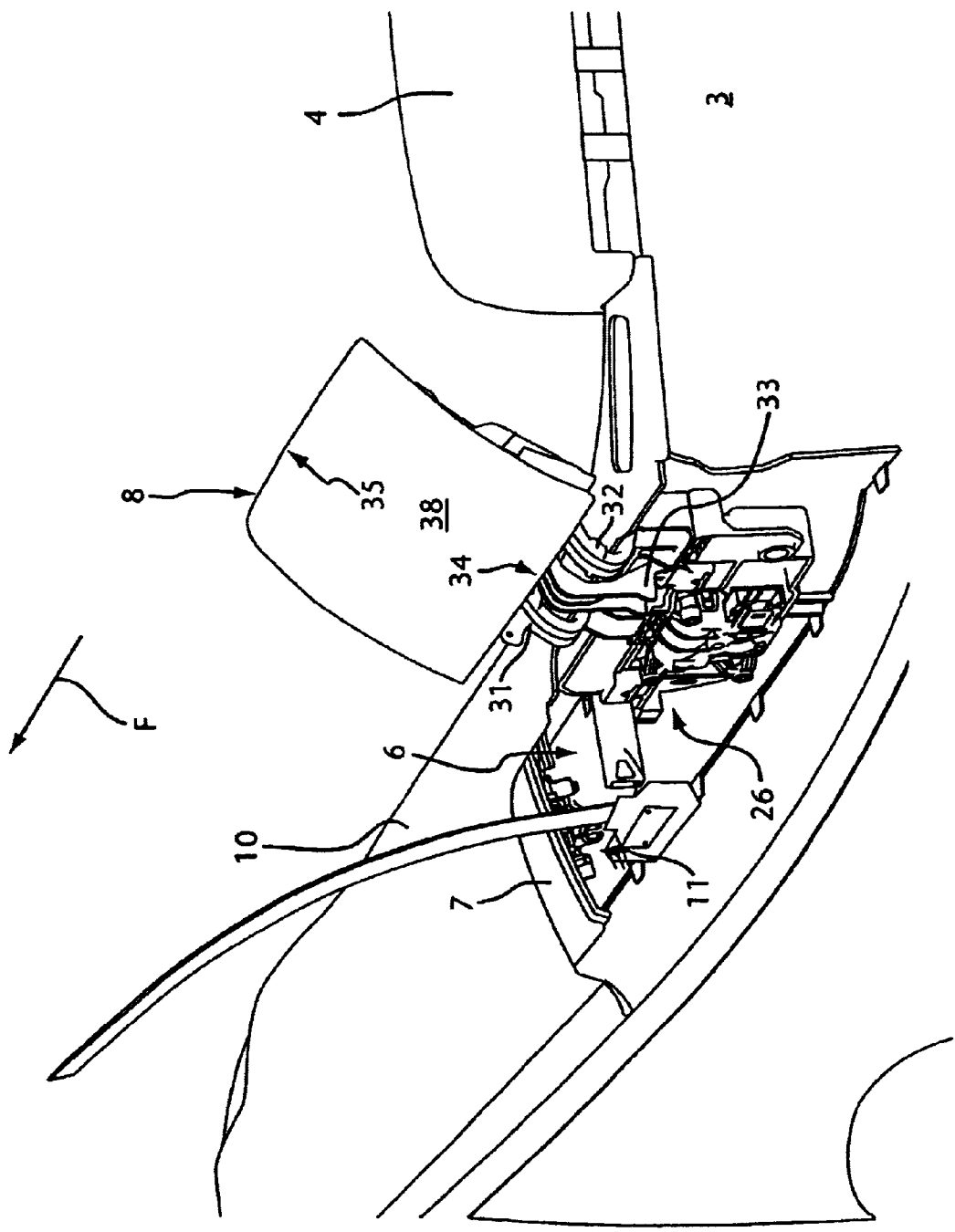
FIG. 5 is a view similar to that of FIG. 4 after the forward panel part has also been moved longitudinally forward.
Figure 9:
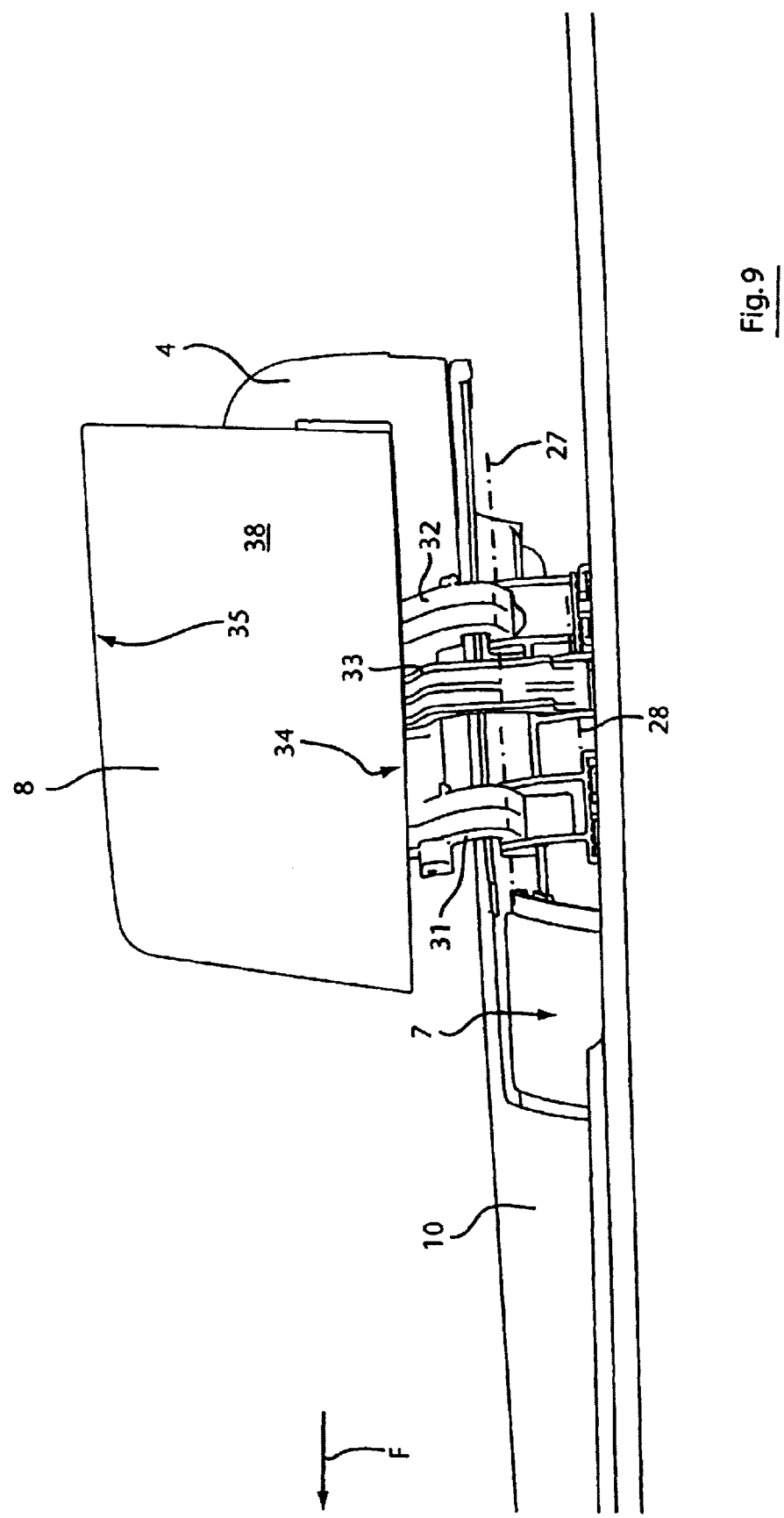
FIG. 9 is a schematic side view of the state according to FIG. 4.
Figure 10:
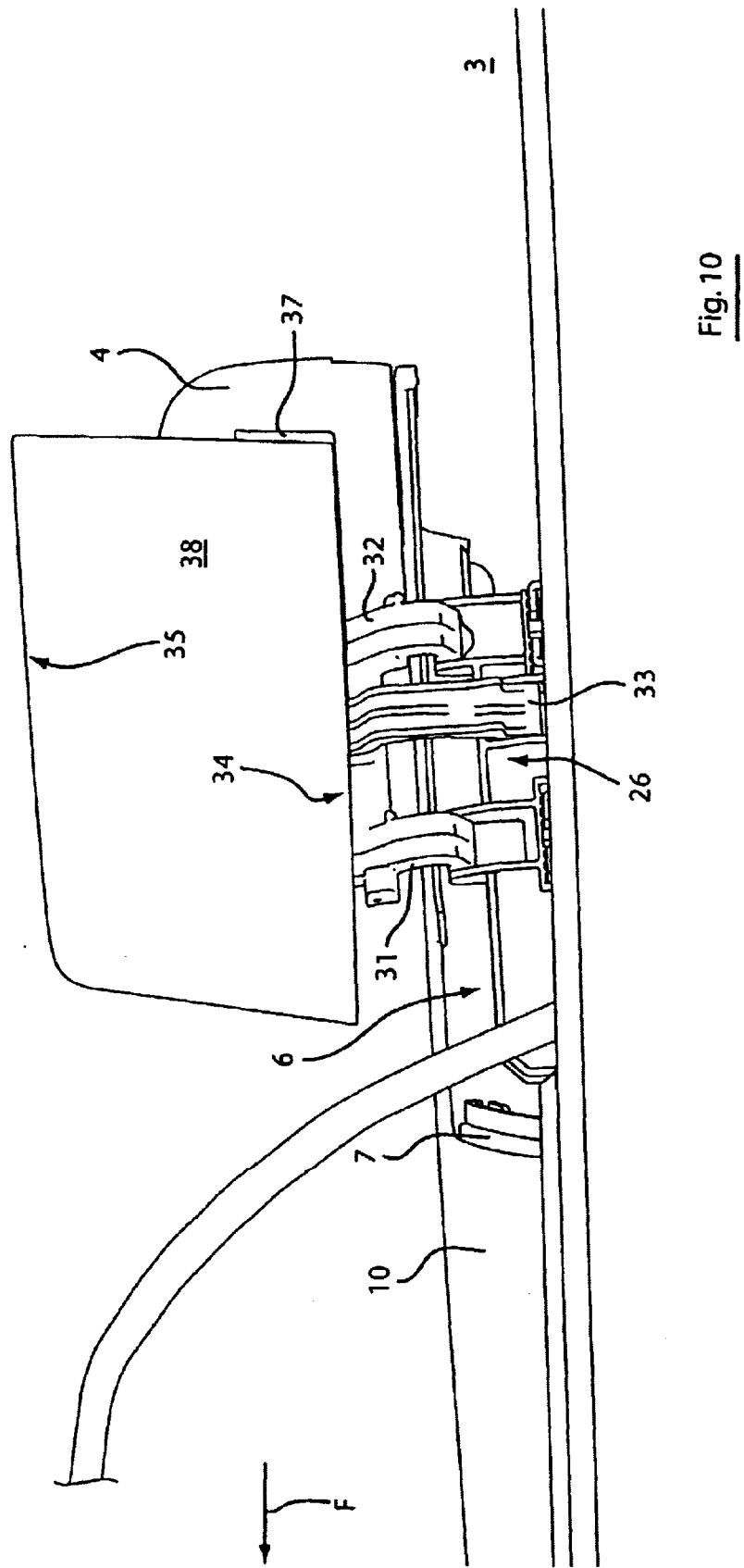
FIG. 10 is a schematic side view of the state according to FIG. 5.
Figure 14:
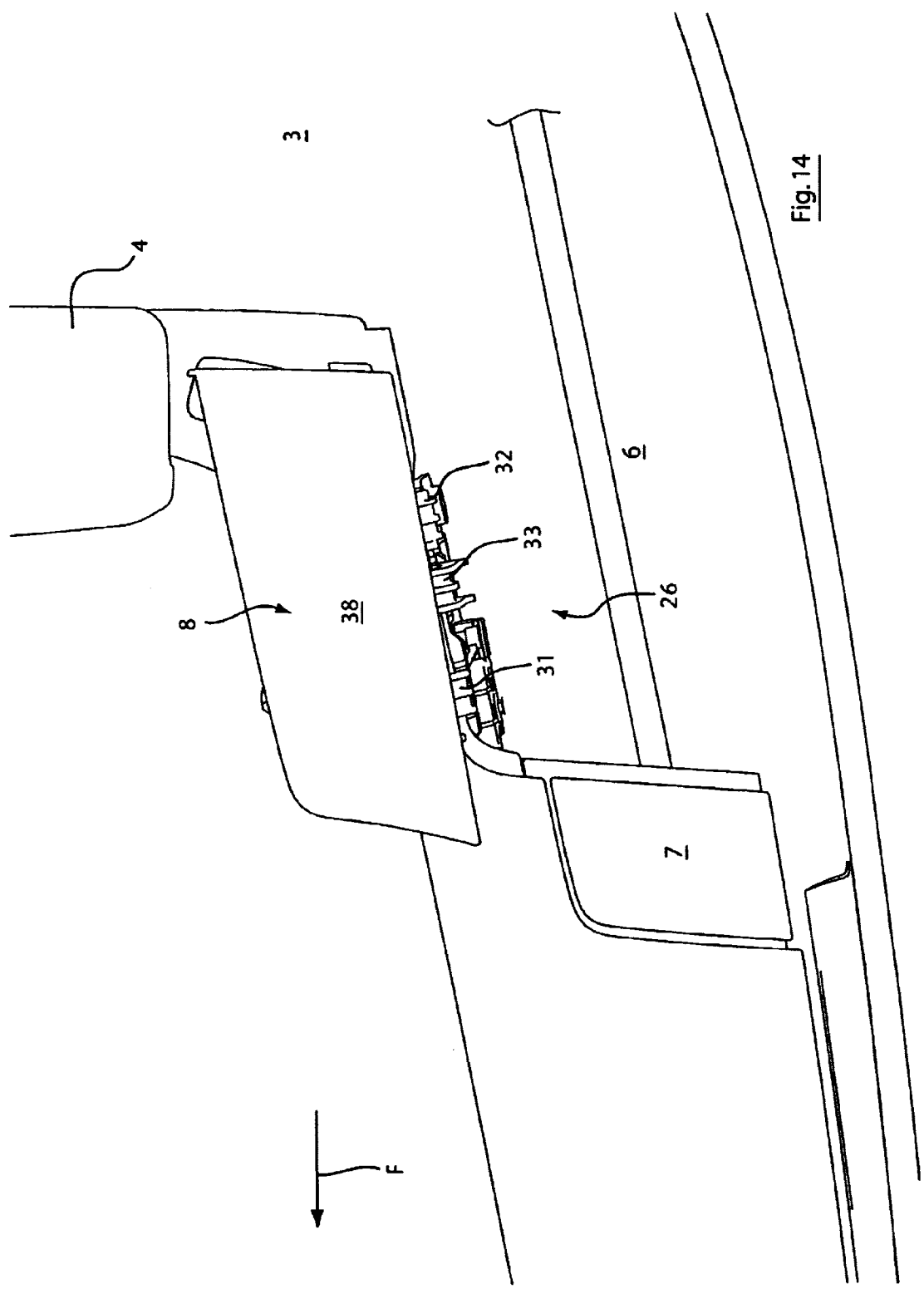
FIG. 14 is a top view of the state according to FIG. 4.

To continue the roof opening process, as shown in FIGS. 4, 9, and 14, the forward panel part 7 is first shifted downwards underneath the panel 10 and then, as shown in FIGS. 5 and 10, pulled underneath the panel 10. The through-opening 6 has now reached its maximum size.

Figure 6:
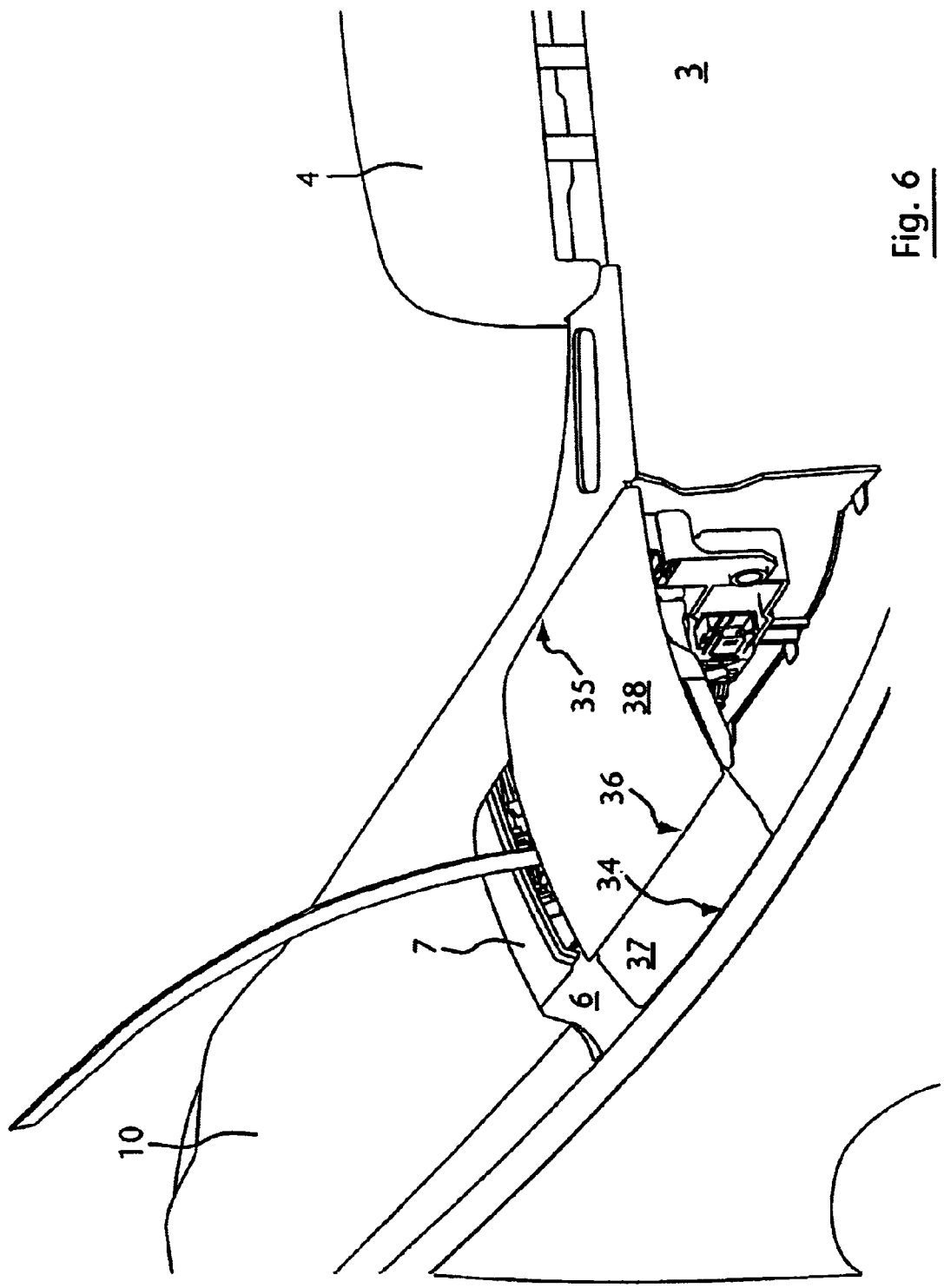
FIG. 6 is a view similar to FIG. 5 after the rear panel part has been closed.
Figure 11:
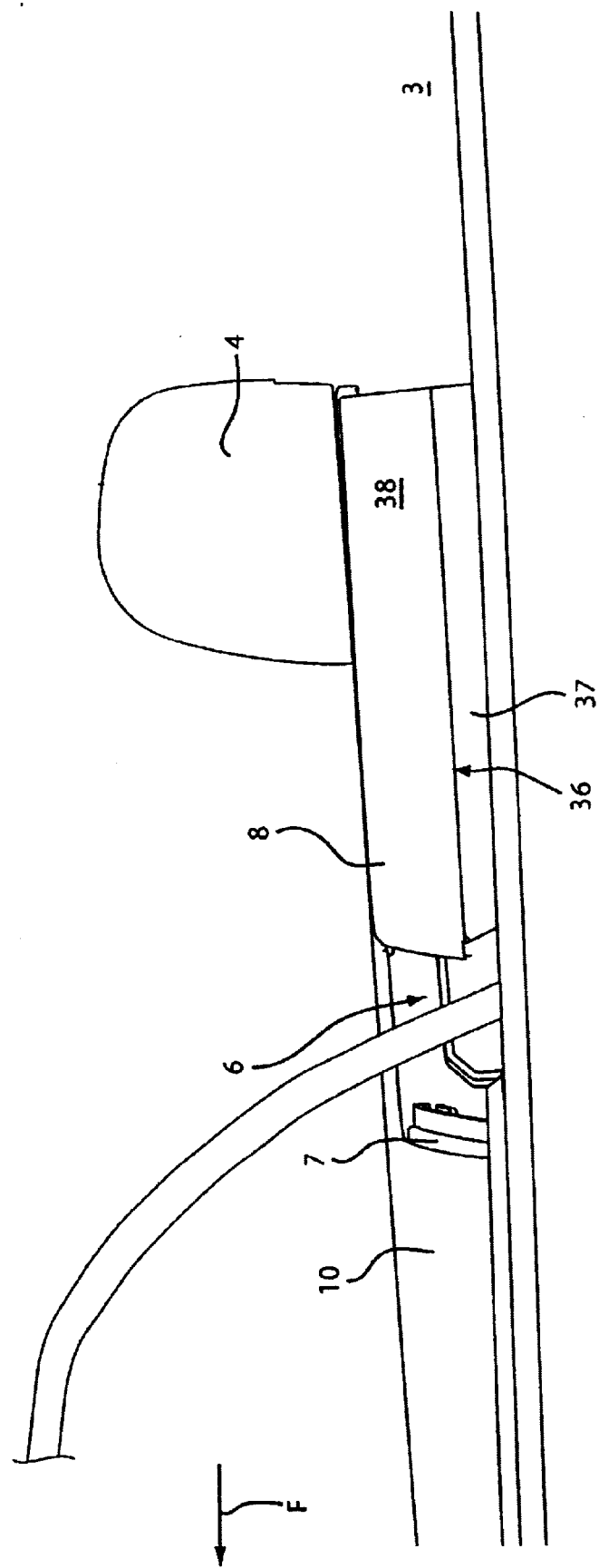
FIG. 11 is a schematic side view of the state according to FIG. 6.
Figure 15:
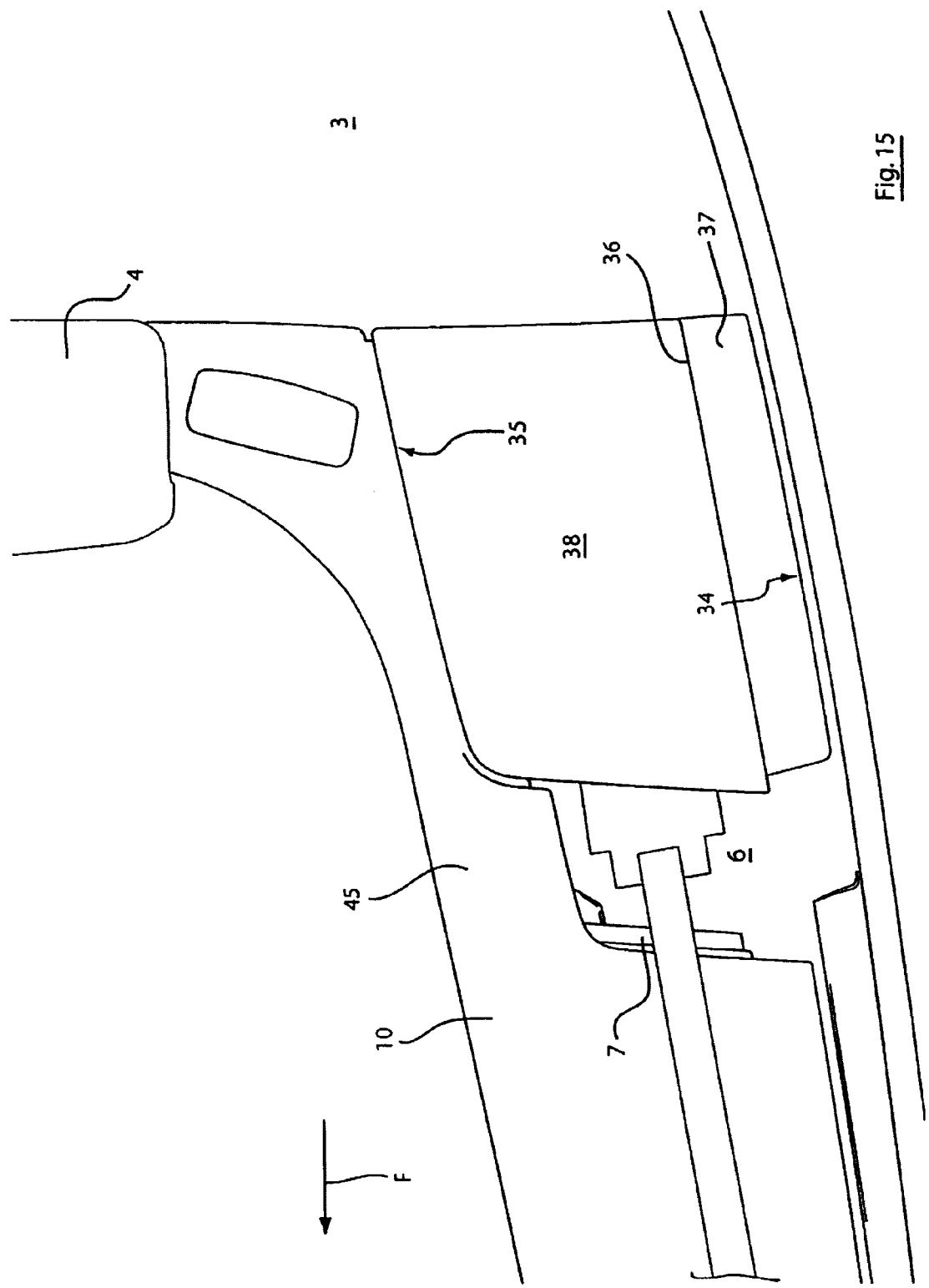
FIG. 15 is a top view of the state according to FIG. 6.

After the roof has been closed, the closure state of the panel parts 7, 8 shown in FIGS. 6, 11, and 15 is reached. The panel part 7 is open to allow the linkage parts of the roof to pass through, whereas the panel part 8 is closed, resting flush with the panel 10. Thus the opening 6 which remains open is as small as possible, and the most continuous possible optical impression is created. The edge 34 of the rear panel part 8 fits snugly against the canopy fabric, as a result of which a very continuous picture is obtained. There is no need for the rear panel part 8 to have a frame to accomplish this. The through-opening 6, however, makes it possible for the linkage parts which hold the roof 2 in its closed position to pass through.

Because the panel part 7 is guided without the need for a frame, the closed area 45 next to the through-opening 6 is quite large, because the opening can be located quite far toward the outside, that is, away from the vertical longitudinal center plane. Thus, even after the forward panel part 7 has been opened, the area 45 closer to the passenger compartment creates a visually attractive appearance.

While specific embodiments of the invention have been shown and described in detail to illustrate the inventive principles, it will be understood that the invention may be embodied otherwise without departing from such principles.

I claim:

1. A convertible vehicle comprising a roof configured to be stowed in a closed position thereof in a rear area of the vehicle, wherein the roof is connected to supports located underneath a windowsill line through linkage elements provided at least on sides of the vehicle, and wherein, in the closed position of the roof, the linkage elements extend through through-openings in a plane of the windowsill line, panel parts for at least partially covering the through-openings for the linkage elements, wherein at least one of the panel parts is a lowerable panel part supported by a bracket acting from underneath the lowerable panel part without additional support, wherein the lowerable panel part is lowerable as the lowerable panel part is being opened.

2. The convertible vehicle according to claim 1, wherein the lowering movement of the lowerable panel part is a movement essentially in the vertical direction.

3. The convertible vehicle according to claim 1, wherein, for exposing the through-opening, the lowerable panel part is movable longitudinally while in a lowered position thereof.

4. The convertible vehicle according to claim 3, comprising springs for effecting the displacement of the slide and upward movement of the raising and lowering device for closing the lowerable panel part.

5. The convertible vehicle according to claim 1, wherein the lowerable panel part is a forwardly arranged panel part in a travel direction of the vehicle, and wherein the panel parts include at least another panel part constructed as a flap part.

6. The convertible vehicle according to claim 5, wherein the flap part located toward the rear with respect to the direction of travel is closed when the roof is in an open position thereof and when the roof is in the closed position.

7. A convertible vehicle comprising a roof configured to be stowed in a closed position thereof in a rear area of the vehicle wherein the roof is connected to supports located underneath a windowsill line through linkage elements provided at least on sides of the vehicle, and wherein, in the closed position of the roof, the linkage elements extend through through-openings in a plane of the windowsill line, panel parts for at least partially covering the through-openings for the linkage elements, wherein at least one of the panel parts is a lowerable panel part supported by a bracket acting from underneath the lowerable panel part, wherein the lowerable panel part is lowerable as the lowerable panel part is being opened wherein, for exposing the through-opening, the lowerable panel part is movable longitudinally while in a lowered position thereof, comprising a longitudinally movable slide for gripping the bracket and a raising and lowering mechanism for the lowerable panel part, wherein the movable slide supports the raising and lowering mechanism.

8. The convertible vehicle according to claim 7, wherein the raising and lowering mechanism is configured to effect a parallel displacement of the lowerable panel part.

9. The convertible vehicle according to claim 8, wherein the raising and lowering mechanism comprises two guide links extending upwardly at a slant, wherein axles attached to extensions engage in the guide links, and wherein the axles are located at a distance below the lowerable panel part.

10. The convertible vehicle according to claim 9, wherein one of the extensions is a pivoting extension, and wherein one of the axles is movably connected through the pivoting extension to the longitudinally movable slide.

11. The convertible vehicle according to claim 7, wherein, when the lowerable panel part is in the lowered position thereof, the raising and lowering mechanism is configured to be slidable longitudinally with the slide.

12. The convertible vehicle according to claim 7, comprising a single intermediate tractive force element for effecting the vertical movement of the lowerable panel part and the longitudinal displacement of the slide.

* * * * *